United States Patent
Poduska et al.

(10) Patent No.: US 6,976,159 B1
(45) Date of Patent: Dec. 13, 2005

(54) SMTP METHOD AND SYSTEM FOR SIMULTANEOUSLY CONFIGURING A PLURALITY OF REMOTE MANAGEMENT APPLIANCES

(75) Inventors: Matthew J. Poduska, Center Point, IA (US); Christopher M. Jensen, Iowa City, IA (US); Scott Kongable, Center Point, IA (US)

(73) Assignee: Crystal Group Inc., Hiawatha, IA (US)

( * ) Notice: Subject to any disclaimer, the term of this patent is extended or adjusted under 35 U.S.C. 154(b) by 413 days.

(21) Appl. No.: 10/064,931

(22) Filed: Aug. 29, 2002

(51) Int. Cl.[7] ............ G06F 15/177; G06F 11/00; G06F 15/16
(52) U.S. Cl. ............ 713/1; 714/30; 709/206
(58) Field of Search ............ 713/100, 1; 710/2, 710/8, 18; 714/30, 47, 48, 57; 709/206

(56) References Cited

U.S. PATENT DOCUMENTS

| | | | |
|---|---|---|---|
| 6,003,070 A * | 12/1999 | Frantz | 709/206 |
| 6,631,247 B1 * | 10/2003 | Motoyama et al. | 399/8 |
| 6,738,930 B1 * | 5/2004 | Medin et al. | 714/30 |
| 6,785,015 B1 * | 8/2004 | Smith et al. | 358/1.15 |
| 2002/0198975 A1 * | 12/2002 | Bogia | 709/223 |
| 2003/0055953 A1 * | 3/2003 | Motoyama et al. | 709/224 |
| 2004/0172263 A1 * | 9/2004 | Prieto-Morano Torres et al. | 705/1 |

* cited by examiner

Primary Examiner—Thomas Lee
Assistant Examiner—Suresh K. Suryawanshi
(74) Attorney, Agent, or Firm—Simmons, Perrine, Albright & Ellwood, PLC

(57) ABSTRACT

A system and method using SMTP messages for remotely and simultaneously reconfiguring monitor parameters in management appliances disposed in numerous dispersed industrial computers.

3 Claims, 2 Drawing Sheets

SMTP METHOD AND SYSTEM FOR SIMULTANEOUSLY CONFIGURING A PLURALITY OF REMOTE MANAGEMENT APPLIANCES

BACKGROUND OF INVENTION

In recent years, industrial personal computers have become increasingly prevalent in many industries. It is not uncommon today to see installations with rows of industrial PCs arranged in racks. While many of these industrial PCs are often designed and manufactured to higher standards than consumer PCs, they still are occasionally in need of repair, and downtime can be expensive and problematic for many industrial PC users. Consequently, users of industrial PCs will often desire to monitor the interior and exterior environments of such PCs, as well as other operational parameters. Monitoring the PCs can help to predict, postpone and eliminate some industrial PC failures. Remote environmental monitoring has been successfully performed with prior art monitors. Additionally, some of these prior art environmental monitors have even been enhanced to permit remote reconfiguration of the parameters of the monitor or management appliance.

Some prior art management appliances have performed the function of generating and issuing alarms when certain parameters in the monitored PC exceed predetermined limits. In such cases, such monitors may generate and dispatch an e-mail, using SMTP, to notify of the event.

While these management appliances or monitors have been used extensively in the past, they do have some drawbacks. First of all, when numerous PCs are being simultaneously remotely monitored, it can become difficult to manage a simple parameter reconfiguration. Typically, these prior art monitors will require that each monitor be independently accessed either on site or via a computer network, and the parameters are then reset. Depending on the number of monitors to be reset, the task can be rather time consuming. With respect to the monitors which issue e-mails as a notification, they do not address how a management appliance might receive information.

Consequently, there exists a need for improved methods and systems for reconfiguring groups of management appliances with common reconfiguration parameters.

SUMMARY OF INVENTION

It is an object of the present invention to provide a system and method for reconfiguring groups of remotely located management appliances in an efficient manner.

It is a feature of the present invention to utilize an SMTP message format for reconfiguring management appliances.

It is another feature of the present invention to include a wizard program to generate SMTP reconfiguration messages.

It is yet another feature of the present invention to provide confirmation e-mails of receipt of SMTP reconfiguration messages.

It is yet another feature of the present invention to include a capability of simultaneously querying a plurality of remotely located management appliances to report on various parameters.

It is still another feature to include the capability to simultaneously upload software, via an attachment, to a message in SMTP format to a management appliance.

It is an advantage of the present invention to achieve improved efficiency in management appliances.

The present invention is an apparatus and method for enhancing the functionality of remote management appliances for industrial personal computers designed to satisfy the aforementioned needs, provide the previously stated objects, include the above-listed features, and achieve the already articulated advantages. The present invention is carried out in a "redundant entry-less" manner in a sense that the occasions for sequentially and independently reconfiguring a group of management appliances with identical changes have been reduced.

Accordingly, the present invention is a system and method including a management appliance being configured to be remotely reconfigured in response to receipt of an e-mail message or other message in compliance with the SMTP standard.

BRIEF DESCRIPTION OF DRAWINGS

The invention may be more fully understood by reading the following description of the preferred embodiments of the invention, in conjunction with the appended drawings wherein.

DETAILED DESCRIPTION

Figure 1:
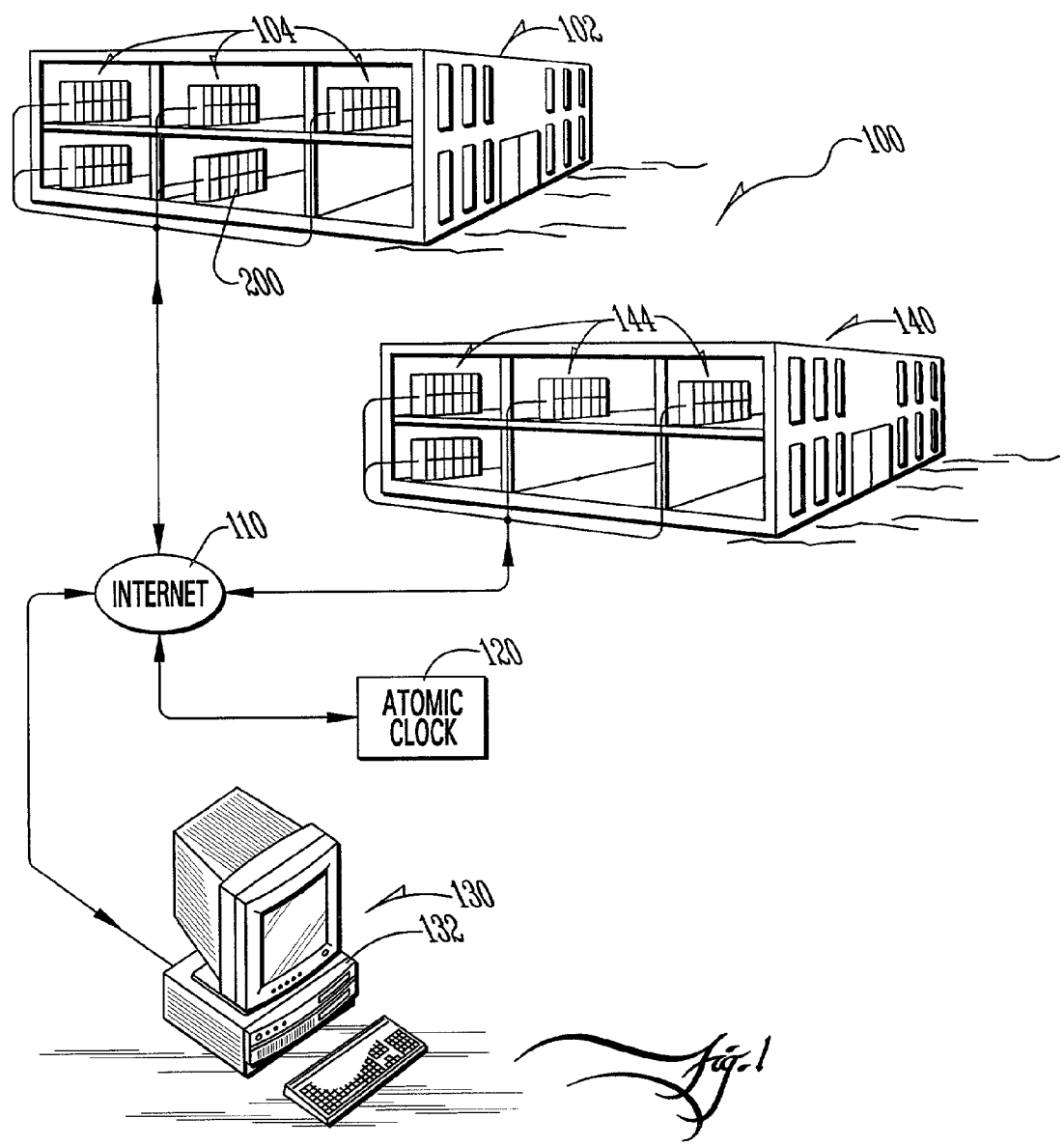
FIG. 1 is a simplified view of a system of the present invention.

Now referring to the drawings wherein like numerals refer to like matter throughout, and more specifically referring to FIG. 1, there is shown a system of the present invention, generally designated 100, including a first location 102 of a plurality of racks 104 of industrial personal computers. Each of the racks 104 will include numerous industrial PCs, a remote monitor-enabled PC 200, which will be discussed in more depth below with respect to FIG. 2, which is representative of the various PCs which may populate the racks 104. The remote monitor-enabled PC 200 need not be in a rack; it may be a stand alone, non-industrial general-purpose personal computer 120. PC 200 is also coupled, via the internet 110, to a remote monitoring station 130 having a remote monitoring computer 132. Also shown is a second location 140, similar to the first location 102, where the second location includes a plurality of racks 144 of industrial personal computers coupled to the internet 110.

In operation, the apparatus and method of the present invention could function as follows: remote monitor-enabled PC 200 has an internal monitor on an expansion card 208 therein which monitors conditions, statuses, events, etc. of the PC 200 and any application software running thereon. PC 200 or the internal monitor on expansion card 208 may from time to time need to be upgraded with a software upgrade or reconfigured. PC 200 and/or internal monitor on expansion card 208 is configured to communicate with incoming messages only and/or with both incoming and outgoing messages using the SMTP standard. For example, the PC 200 may have an alarm card therein which may be monitoring a temperature of the host CPU and generate an alarm when the temperature of the host CPU reaches a preset temperature threshold. If for some reason the host CPU were determined to be more heat tolerant than at first believed, the threshold for issuing an alarm would need to be raised to avoid unnecessary alarms. However, this would be the case for every similar PC in the racks 104 and 144. To go in and individually reset, via an on-site technician or via a web page for each PC, would be very time consuming. Instead, remote monitoring station 130, with its remote monitoring computer 132, could be used in conjunction with a wizard software program to generate an e-mail message or other message in the SMTP format which includes therein formatted reconfiguration instructions which are recognizable by "reverse wizard" translation software located in PC 200. The translation software would convert the SMTP message into instructions to reconfigure the alarm threshold on the PC 200. Of course, all PCs which are configured similar to PC 200, and which receive the e-mail message, could then be reconfigured without individual attention by a technician. The time savings achieved is dependent upon the number of PCs needing to be reconfigured.

Figure 2:
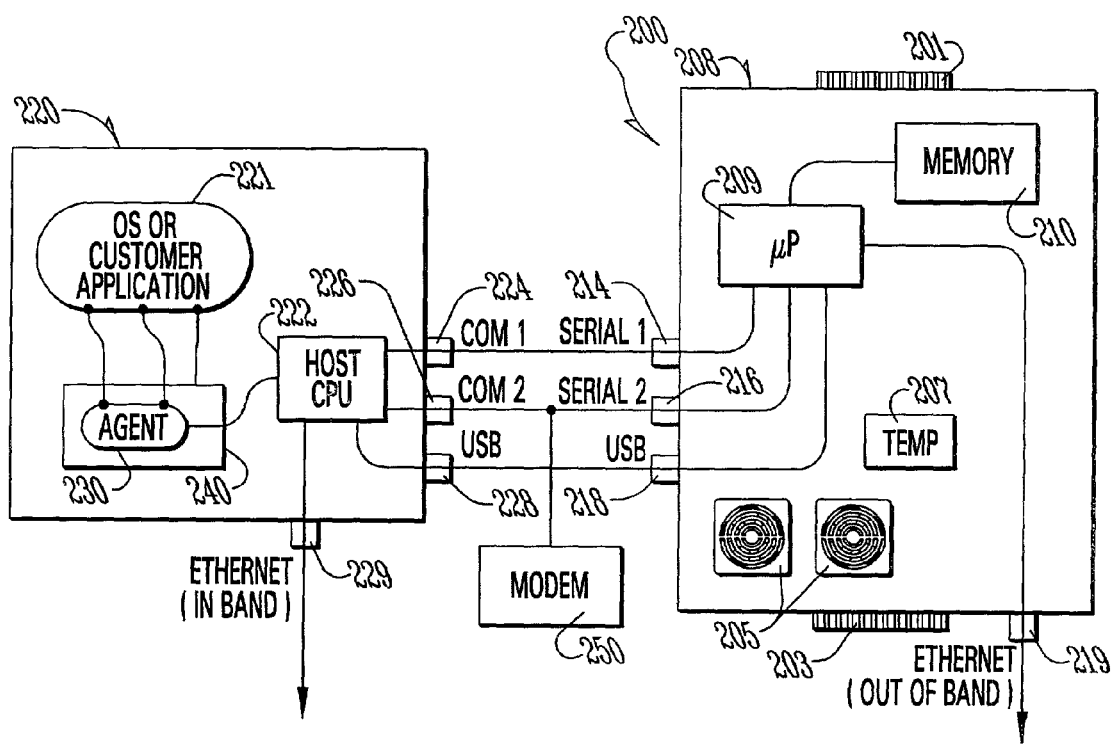
FIG. 2 is a simplified view of a portion of a monitored computer of a system of the present invention.

A detailed understanding of one possible embodiment of the present invention can be achieved by now referring to FIG. 2, which shows a combination of circuit cards, comprising a portion of the personal computer 200, including a host CPU card 220, which can be either a motherboard or a CPU card (for use with a passive backplane) and an alarm or expansion card 208, which includes an alarm or expansion card microprocessor 209, an alarm card # 1 serial port 214, an alarm card #2 serial port 216 and USB port 218. In a preferred embodiment, alarm card 208 has ISA bus connections 201 and PCI bus connections 203 on opposing sides of the card 208 so it may be deployed in a PC with either type of expansion bus by merely flipping the card 208 over. In a preferred embodiment, the card 208 receives only power through its expansion bus connections 201 or 203. The host CPU card 220 provides the primary processing capabilities for industrial personal computer 200, and the alarm card 208 provides several functions, including typical alarm card functions of monitoring and reporting environmental conditions in PC 200, such as temperatures 207, fans 205, power levels, etc. Similar to prior art alarm cards, alarm card 208 also includes a capability of "out-of-band" reporting and communication via alarm card Ethernet port 219. Ethernet is a preferred port, but any communication scheme capable of digital communication could be used as well. Alarm card Ethernet port 219 may be coupled to the internet or a proprietary network, depending upon user's preferences. A remote monitoring station 130 (FIG. 1) can access the alarm card 208 via alarm card Ethernet port 219 or through an in-band connection with the host CPU card 220 and associated structure. One of the key novel aspects of the present invention is that a translation software program which translates an SMTP message to instructions necessary to reconfigure the alarm card 208 or the PC 200 resides in memory 210 on alarm card 208 and is accessible via alarm card Ethernet port 219. In the alternative, this translation software could reside on CPU card 220. Also in the alternative, the SMTP reconfiguration message could be provided to the PC 200 via modem 250, or other similar communication means. Then the post translation reconfiguration information could be provided to alarm card 208 via ports 224, 226 and 228. A software agent 230 is disposed in memory 240 on host CPU card 220. The purpose of agent 230 is quite flexible. It could be used as an e-mail transmitting means and an e-mail receiving means to process incoming SMTP messages, or it could perform other functions as well.

Alarm card 208 and host CPU card 220 are coupled together in several ways. For example, the COM 1 port 224 of host CPU card 220 is coupled to the SERIAL 1 port 214 on alarm card 208. Similarly, COM 2 port 226 is coupled to SERIAL 2 port 216, and USB port 228 is coupled to USB port 218. Also, the two Ethernet ports 219 and 229 could be interconnected through an internet or other network connection. SERIAL 2 port 216 and COM 2 port 226 may be coupled to a modem 250 and then via an external telephone, fiber optic or other network (not shown) to a remote administrator. When the terms "remote" or "remotely located" or the like are used herein, they shall be understood to refer to a distance in excess of 10 miles.

A more detailed understanding of the operation of the apparatus and method of the present invention could be obtained by referring to the following: an alarm card 208 disposed inside of PC 200 monitors various environmental conditions therein. A reconfiguration SMTP message is received by PC 200 either through modem 250 (in-band) or one of the out of band ports which are shown as Ethernet, but any suitable port could be used as well. The SMTP message is translated to reconfiguration instructions by the host CPU 222 or the alarm card microprocessor 209. The parameters of the alarm card are changed in response to the reconfiguration instructions, and a confirming e-mail is provided back to the source of the SMTP message. Of course, it would be desirable to include security provisions to assure that the SMTP message is a proper message.

Throughout this description, reference is made to an industrial PC and to an Ethernet, because it is believed that the beneficial aspects of the present invention would be most readily apparent when used in connection with industrial PCs and Ethernet connections; however, it should be understood that the present invention is not intended to be limited to industrial PCs and Ethernet connections and should be hereby construed to include other non-industrial PCs and non-Ethernet applications as well.

Throughout this description, references have been made to monitoring environmental conditions in a host computer and an alarm card. It should be understood that the present invention is also applicable to monitoring conditions or parameters within the host PC which relate to the OS and customer applications 221 or other functions which are not typically associated with alarm cards.

Also, the above description with respect to FIG. 2 discusses the use of an out-of-band communication path from the alarm card 208. While it may be preferred to have alarm cards communicate via an out-of-band communication path, it is not necessary to achieve the benefits of the present invention. The alarm card 208 could communicate through the host CPU and connections with it and, therefore, be an in-band communication path. It also is possible that the alarm card 208 be incorporated and integrated with the functions of the host CPU card 220, and still provide the benefits of having time tagged records which are highly precise or rely on an extremely highly precise time of day signal.

Throughout this description, the terms "industrial personal computer" and "industrial PC" are used to represent a PC of the type which is capable of being stored in racks of multiple rows of PCs, where each row has multiple PCs and where the PCs are coupled to wiring associated with the rack and other equipment by at least one connector at the rear end of the PC. This definition of industrial PCs is not intended to include laptop PCs, which have connectors on the rear end of the laptop for coupling with a docking station or a port replicator. Consequently, the term "industrial PC" will specifically exclude any computer which has along its top side a hinged display screen hinged along the rear end of the PC.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

What is claimed is:

1. A system comprising:
   a first computer, at a first location, which is configured to send and receive SMTP e-mail messages over an internet connection;
   a first wizard program, disposed on said first computer, said first wizard program configured to generate an SMTP broadcast message which is representative of a management appliance reconfiguration signal and further for addressing said SMTP broadcast message to a plurality of e-mail addresses;
   where each of said plurality of e-mail addresses is uniquely associated with a different one of a plurality of management appliances;
   e-mail transmitting means for transmitting said SMTP broadcast message over said internet connection; and,
   each of said plurality of management appliances comprising:
      an expansion card, configured to mate along one side with an internal PC bus when said internal PC bus is conforming to a first predetermined bus standard and is alternately configured to mate along an opposite side with said internal PC bus when said internal PC bus is conforming to a second predetermined bus standard;
      a communication port which is out of band with respect to a primary communication port for a host computer;
      said expansion card adapted to receive only power rough said internal PC bus;
      means for monitoring environmental and application software events occurring in said host computer, where said means for monitoring has a plurality of reconfigurable monitored parameters; and,
      means for slating said SMTP broadcast message into reconfiguration instructions which are configured to change said plurality of reconfigurable monitored parameters; and,
      means for generating and transmitting a confirmation e-mail, addressed to an e-mail address for said first computer, after receipt of said SMTP broadcast message via said out-of-band communication port.

2. An alarm card reconfiguration system for reconfiguring characteristics of an alarm card on an industrial personal computer, of the type having a host CPU therein, the apparatus comprising:
   an alarm expansion card disposed in and monitoring a plurality of characteristics of said industrial personal computer and coupled to said host CPU;
   the alarm expansion cad having an alarm expansion card microprocessor therein and configured to monitor environmental characteristics of the industrial personal computer and further configured to compare monitored environmental characteristics of the industrial personal computer with configurable parameters of alarm thresholds for the monitored environmental characteristics of the industrial personal computer;
   translation software disposed in said industrial personal computer and coupled to and executed by at least one of said host CPU and said alarm expansion card microprocessor;
   wherein the alarm expansion card, configured to mate along one side with an internal PC bus when said internal PC bus is conforming to a first predetermined bus standard and is alternately configured to mate along an opposite side with internal PC bus when said internal PC bus is conforming to a second predetermined bus standard;
   said translation software, when executed, configured to convert an incoming SMTP formatted reconfiguration message into a second format which is capable of causing a reconfiguration of one of the configurable parameters of alarm thresholds for monitored environmental characteristics which is monitored at least in part in reliance upon operation of said alarm expansion card microprocessor.

3. A method of reconfiguring a parameter in an alarm expansion card in an industrial personal computer which is remotely located with respect to a first location;
   using, at said first location, a wizard software program to generate an SMTP message which is representative of an instruction to change a configurable environmental parameter of an alarm card which is disposed in the industrial personal computer at a second location which is remotely located from said first location;
   transmitting said SMTP message to said industrial personal computer;
   translating said SMTP message, at said second location, into an alarm card reconfiguration instruction; and,
   reconfiguring an environmental monitoring parameter of said industrial personal computer in response to receipt of said alarm card reconfiguration instruction; where the environmental monitoring parameter is a parameter of an internal environmental characteristic of said industrial computer wherein the alarm expansion card, configured to mate along one side with an internal PC bus when said internal PC bus is conforming to a first predetermined bus standard and is alternately configured to mate along an opposite side with internal PC bus when said internal PC bus is conforming to a second predetermined bus standard.

* * * * *

UNITED STATES PATENT AND TRADEMARK OFFICE
CERTIFICATE OF CORRECTION

PATENT NO. : 6,976,159 B1
DATED : December 13, 2005
INVENTOR(S) : Matthew J. Poduska et al.

It is certified that error appears in the above-identified patent and that said Letters Patent is hereby corrected as shown below:

Column 5,
Line 33, delete "rough" and insert -- through --.
Line 38, delete "slating" and insert -- translating --.

Column 6,
Line 44, insert a semicolon after "computer" and then a new paragraph.

Signed and Sealed this

Fourteenth Day of March, 2006

JON W. DUDAS
*Director of the United States Patent and Trademark Office*